US012013105B1

(12) United States Patent
Hong et al.

(10) Patent No.: US 12,013,105 B1
(45) Date of Patent: Jun. 18, 2024

(54) INDUSTRIAL LIGHTING DEVICE HAVING INTEGRATED-TYPE TOP LIGHT-EMITTING MODULE

(71) Applicant: Xiamen PVTECH Co., Ltd., Fujian (CN)

(72) Inventors: Haibo Hong, Fujian (CN); Fuxing Lu, Fujian (CN); Liangliang Cao, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/138,748

(22) Filed: Apr. 25, 2023

(30) Foreign Application Priority Data

Jan. 16, 2023 (CN) ......................... 202310067868.2

(51) Int. Cl.
*F21V 29/70* (2015.01)
*F21S 8/06* (2006.01)
*F21V 23/00* (2015.01)
*F21V 31/00* (2006.01)
*F21W 131/40* (2006.01)

(52) U.S. Cl.
CPC ................ *F21V 29/70* (2015.01); *F21S 8/06* (2013.01); *F21V 23/003* (2013.01); *F21V 31/005* (2013.01); *F21W 2131/40* (2013.01)

(58) Field of Classification Search
CPC ...... F21V 29/70; F21V 23/003; F21V 31/005; F21S 8/06; F21W 2131/40
See application file for complete search history.

(56) References Cited

U.S. PATENT DOCUMENTS 6,309,083 B1 * 10/2001 Lathrop ................ F24F 13/078 362/350
8,052,304 B2 * 11/2011 Yang ....................... F21V 29/89 362/249.02
9,581,324 B2 * 2/2017 Zhai ........................ F21V 21/08
10,036,534 B2 * 7/2018 Morello .................. F21V 29/78
11,819,963 B1 * 11/2023 Hong ...................... F21V 15/01
2012/0140468 A1 * 6/2012 Chang ................... F21V 7/0016 362/249.03
2016/0290603 A1 * 10/2016 Morello .................. F21S 8/061
(Continued)

FOREIGN PATENT DOCUMENTS

CN 214663830 U 11/2021
JP 2003-100139 A 4/2003
JP 2011-243501 A 12/2011

*Primary Examiner* — Tsion Tumebo
(74) *Attorney, Agent, or Firm* — Winston Hsu

(57) ABSTRACT

An industrial lighting device includes a driving module, a main light-emitting module and a top light-emitting module. The driving module has a top surface and a protrusion portion. The main light-emitting module is fixed at the protrusion portion. The top light-emitting module is disposed on the top surface, and includes a heat dissipation base, a top light source board and a top cover. The heat dissipation base is provided with a base body, an outer wall and a central fixation portion. The central fixation portion is disposed at the center of one side of the base body. The outer wall is disposed on the base body and surrounds the central fixation portion, such that an accommodating space is formed between them. The top light source board is disposed in the accommodating space and the top cover is disposed on the outer wall in order to cover the accommodating space.

8 Claims, 8 Drawing Sheets

(56) References Cited

U.S. PATENT DOCUMENTS

| | | | | |
|---|---|---|---|---|
| 2019/0293267 | A1* | 9/2019 | Marshal | F21V 23/0464 |
| 2020/0200378 | A1* | 6/2020 | Stokes | F21V 29/745 |
| 2020/0300420 | A1* | 9/2020 | Guo | F21V 23/009 |
| 2021/0199118 | A1* | 7/2021 | Suzuki | F04D 29/005 |
| 2021/0388844 | A1* | 12/2021 | Rhoades | F04D 29/005 |
| 2022/0381429 | A1* | 12/2022 | Wang | G03B 21/16 |

* cited by examiner

INDUSTRIAL LIGHTING DEVICE HAVING INTEGRATED-TYPE TOP LIGHT-EMITTING MODULE

BACKGROUND OF THE INVENTION

1. Field of the Invention

The present invention relates to an industrial lighting device, in particular to an industrial lighting device having integrated-type top light-emitting module.

2. Description of the Prior Art

The top light-emitting modules of most of currently available industrial lighting devices (such as mining lamps, etc.) are directly disposed on the backs of the heat radiators thereof, and the above structure will influence the heat dissipation of the lighting device. Besides, the top light-emitting module of the currently available industrial lighting device will also be influenced by the heat radiation of the heat radiator thereof, so that the temperature of the top light-emitting module is always high. For the reason, the top light-emitting module is prone to suffer from light decay.

In addition, the top light-emitting module of the currently available industrial lighting device is composed of several modules, and the manufacturing process thereof consumes a lot of manpower and time. In addition, the water-proof function of the currently available industrial lighting device still needs to be further improved.

Further, most of the currently available industrial lighting devices only have one type of fixation element. Thus, it needs additional adapter pieces to realize different fixing methods. The aforementioned adapter pieces also require additional costs. Therefore, the currently available industrial lighting devices cannot meet the actual requirements.

SUMMARY OF THE INVENTION

One embodiment of the present invention provided an industrial lighting device having integrated-type top light-emitting module, which includes a driving module, a main light-emitting module and a top light-emitting module. The driving module has a top surface and a protrusion portion. The main light-emitting module is fixed at the protrusion portion of the driving module. The top light-emitting module is disposed on the top surface of the driving module, and includes a heat dissipation base, a top light source board and a top cover. The heat dissipation base of the top light-emitting module is provided with a base body, an outer wall and a central fixation portion. The central fixation portion of the heat dissipation base is disposed at the center of one side of the base body of the heat dissipation base. The outer wall of the heat dissipation base is disposed on the base body of the heat dissipation base and surrounds the central fixation portion of the heat dissipation base, such that an accommodating space is formed between the base body, the outer wall and the central fixation portion of the heat dissipation base. The top light source board of the top light-emitting module is disposed in the accommodating space, and the top cover of the top light-emitting module is disposed on the outer wall of the heat dissipation base in order to cover the accommodating space. The central fixation portion of the heat dissipation base penetrates through a central hole of the top cover of the top light-emitting module.

In one embodiment, the top light-emitting module further includes a top outer water-proof ring surrounding the outer wall of the heat dissipation base and a top inner water-proof ring surrounding the central fixation portion of the heat dissipation base.

In one embodiment, the central fixation portion of the heat dissipation base is connected to a fixation element detachably fixed at the central fixation portion of the heat dissipation base.

In one embodiment, the industrial lighting device further includes a driving module adapter base, wherein the top light-emitting module is connected to the top surface of the driving module via the driving module adapter base.

In one embodiment, the driving module adapter base includes an upper connecting portion, a lower connecting portion and a partitioning portion disposed between the upper connecting portion and the lower connecting portion.

In one embodiment, the heat dissipation base further includes a base body fixation portion disposed at the center of another side of the base body of the heat dissipation base and connected to the upper connecting portion of the driving module adapter base.

In one embodiment, the top surface of the driving module is provided with a top surface fixation portion connected to the lower connecting portion of the driving module adapter base.

In one embodiment, the other side of the base body of the heat dissipation base is provided with a plurality of upper heat dissipation fins.

In one embodiment, the main light-emitting module includes a heat radiator, a main light source board and a lens. The main light source board and the lens are disposed on one side of the heat radiator, such that the main light source board is disposed between the lens and the heat radiator.

In one embodiment, the other side of the heat radiator is provided with a plurality of main heat dissipation fins.

The industrial lighting device having integrated-type top light-emitting module in accordance with the embodiments of the present invention may have the following advantages:

(1) In one embodiment of the present invention, the industrial lighting device includes a driving module, a main light-emitting module and a top light-emitting module. The top light-emitting module is disposed on the top surface of the driving module, and includes a heat dissipation base, a top light source board and a top cover. The heat dissipation base of the top light-emitting module includes a base body, an outer wall and a central fixation portion. The above structure makes the module an top light-emitting have integrated-type structure, which can significantly reduce the manpower cost and time cost of the manufacturing process of the industrial lighting device. Therefore, the industrial lighting device can meet the needs of market.

(2) In one embodiment of the present invention, the industrial lighting device includes the integrated-type top light-emitting module. The top light-emitting module includes a top outer water-proof ring and a top inner water-proof ring. The top outer water-proof ring surrounds the outer wall of the heat dissipation base of the top light-emitting module and the top inner water-proof ring surrounds the central fixation portion of the heat dissipation base of the top light-emitting module. The above dual-layer water-proof structure design significantly improves the water-proof performance of the top light-emitting module. Accordingly, the industrial lighting device can be applicable to humid environments and the failure rate thereof can also be greatly reduced.

(3) In one embodiment of the present invention, the industrial lighting device has a driving module adapter base, which includes a partitioning portion, an upper connecting portion and a lower connecting portion. The top light-emitting module is connected to the top surface of the driving module via the driving module adapter base. The above structure design can make the top light-emitting module be away from the main light-emitting module by a certain distance in order to avoid that the top light-emitting module is influenced by the heat radiation generated by the heat radiator. The above structure design can effectively avoid that the top light-emitting module suffers from light decay with a view to extending the service life of the top light-emitting module.

(4) In one embodiment of the present invention, the top light-emitting module has a heat dissipation base and the other side of the base body of the heat dissipation base is provided with a plurality of upper heat dissipation fins. The above upper heat dissipation fins can further improve the heat dissipation effect of the top light-emitting module, which can effectively avoid that the top light-emitting module suffers from light decay so as to extend the service life of the top light-emitting module.

(5) In one embodiment of the present invention, the central fixation portion of the heat dissipation base is detachably connected to the fixation element, so the user can replace the fixation element according to actual requirements. Accordingly, the industrial lighting device can provide different fixation mechanisms without any adapter piece. Therefore, the industrial lighting device can further conform to actual requirements.

(6) In one embodiment of the present invention, the industrial lighting device is of simple structure, so can achieve the desired technical effects without significantly increasing the cost thereof. Thus, the industrial lighting device can achieve high commercial value.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
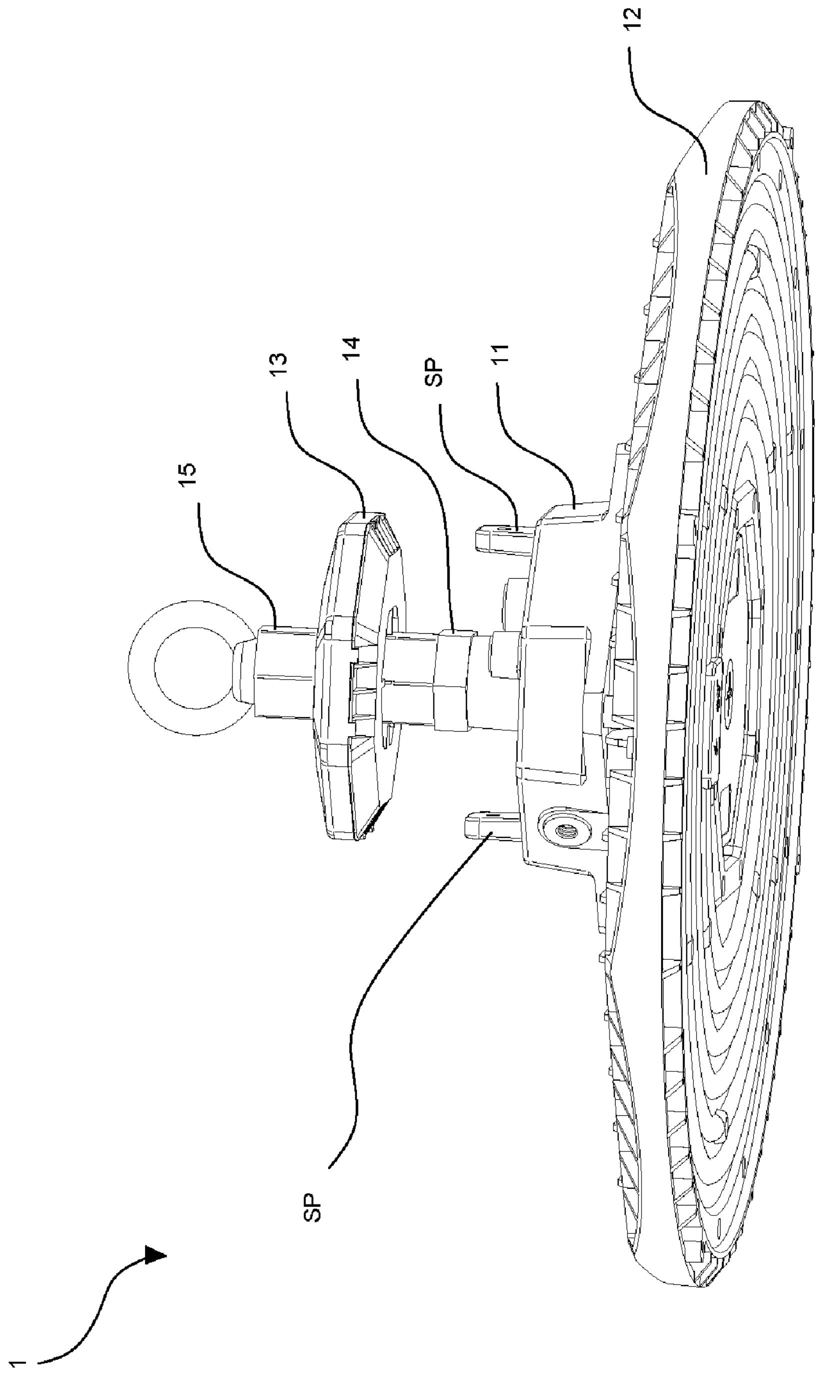
FIG. 1 is an assembly view of an industrial lighting device having integrated-type top light-emitting module in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
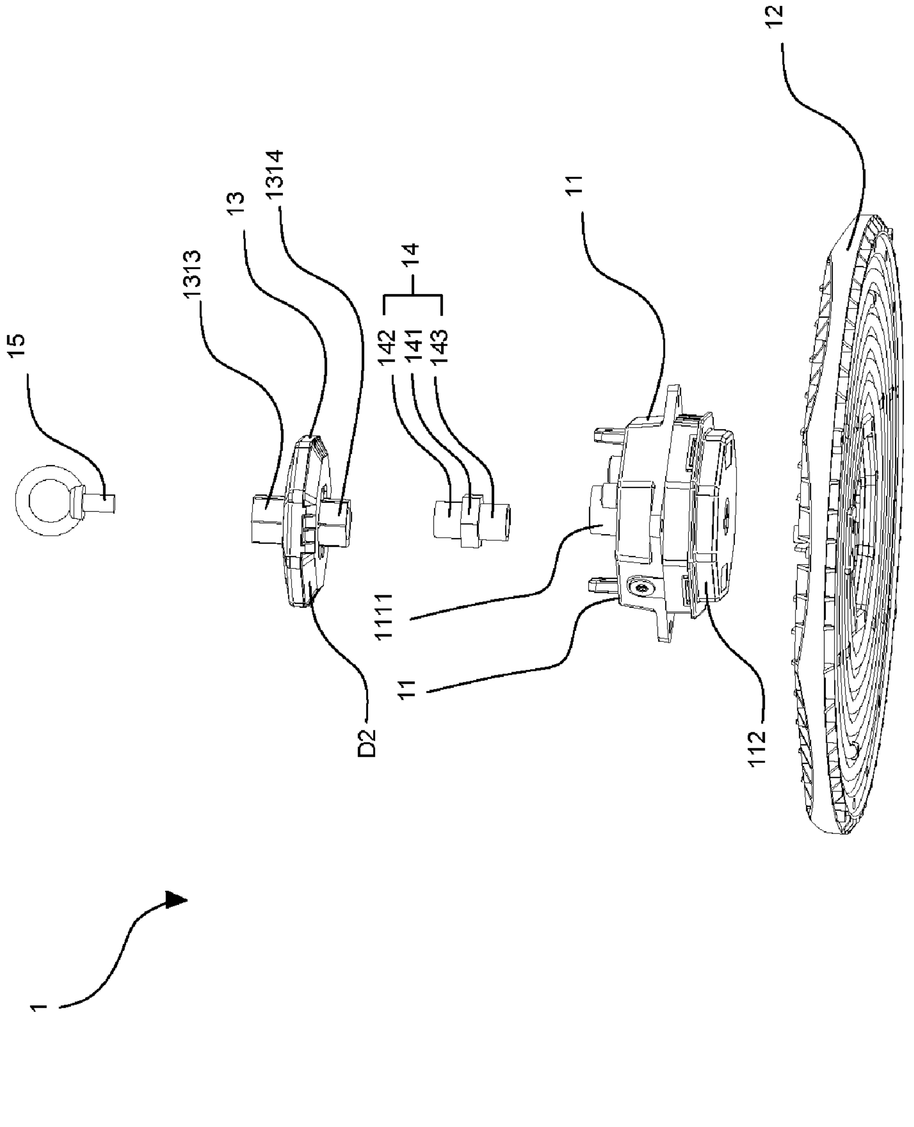
FIG. 2 is a first exploded view of the industrial lighting device having integrated-type top light-emitting module in accordance with one embodiment of the present invention.
Figure 3:
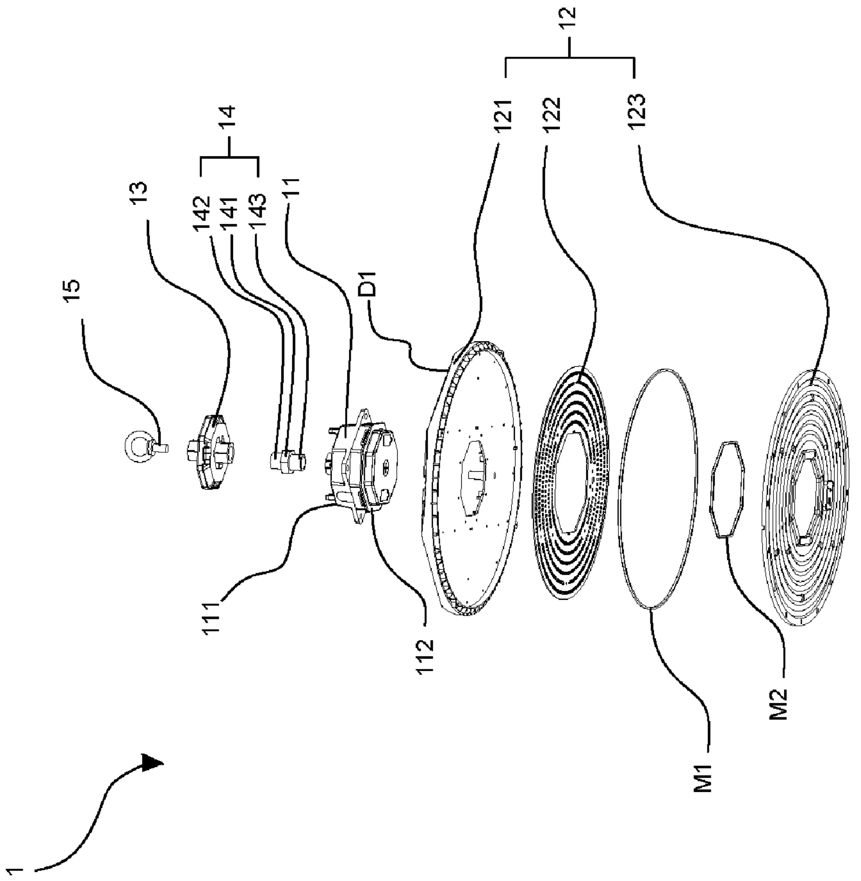
FIG. 3 is a second exploded view of the industrial lighting device having integrated-type top light-emitting module in accordance with one embodiment of the present invention.

Please refer to FIG. 1, FIG. 2 and FIG. 3. FIG. 1 is an assembly view of an industrial lighting device having integrated-type top light-emitting module in accordance with one embodiment of the present invention. FIG. 2 is a first exploded view of the industrial lighting device having integrated-type top light-emitting module in accordance with one embodiment of the present invention. FIG. 3 is a second exploded view of the industrial lighting device having integrated-type top light-emitting module in accordance with one embodiment of the present invention. As shown in FIG. 1, FIG. 2 and FIG. 3, the industrial lighting device 1 includes a driving module 11, a main light-emitting module 12, a top light-emitting module 13, a driving module adapter base 14 and a fixing element 15.

The driving module 11 has a top surface 111 and a protrusion portion 112. The driving module 11 is connected to the main light-emitting module 12 and the top light-emitting module 13 in order to drive the main light-emitting module 12 and the top light-emitting module 13. In one embodiment, the driving module 11 may include a power supply circuit, a power converter circuit, a filter circuit or other necessary circuits.

The main light-emitting module 12 is fixed at the protrusion portion 112 of the driving module 11. The main light-emitting module 12 includes a heat radiator 121, a main light source board 122 and a lens 123. The main light source board 122 and the lens 123 are disposed on one side of the heat radiator 121, such that the main light source board 122 is disposed between the lens 123 and the heat radiator 121. The other side of the heat radiator 121 is provided with a plurality of main heat dissipation fins D1. In addition, the main light-emitting module 12 further includes a main outer water-proof ring M1 and a main inner water-proof ring M2, which are disposed between the lens 123 and the heat radiator 121 in order to improve the water-proof performance of the main light-emitting module 12. In one embodiment, the main light source board 122 may include a circuit board and a plurality of light-emitting diodes (LEDs) disposed on the circuit board.

The top light-emitting module 13 is disposed on the top surface 111 of the driving module 11. The top light-emitting module 13 is connected to the top surface 111 of the driving module 11 via the driving module adapter base 14.

The driving module adapter base 14 includes a partitioning portion 141, a top connecting portion 142 and a lower connecting portion 143. The partitioning portion 141 is disposed between the top connecting portion 142 and the lower connecting portion 143.

The embodiment just exemplifies the present invention and is not intended to limit the scope of the present invention; any equivalent modification and variation according to the spirit of the present invention is to be also included within the scope of the following claims and their equivalents.

Figure 4:
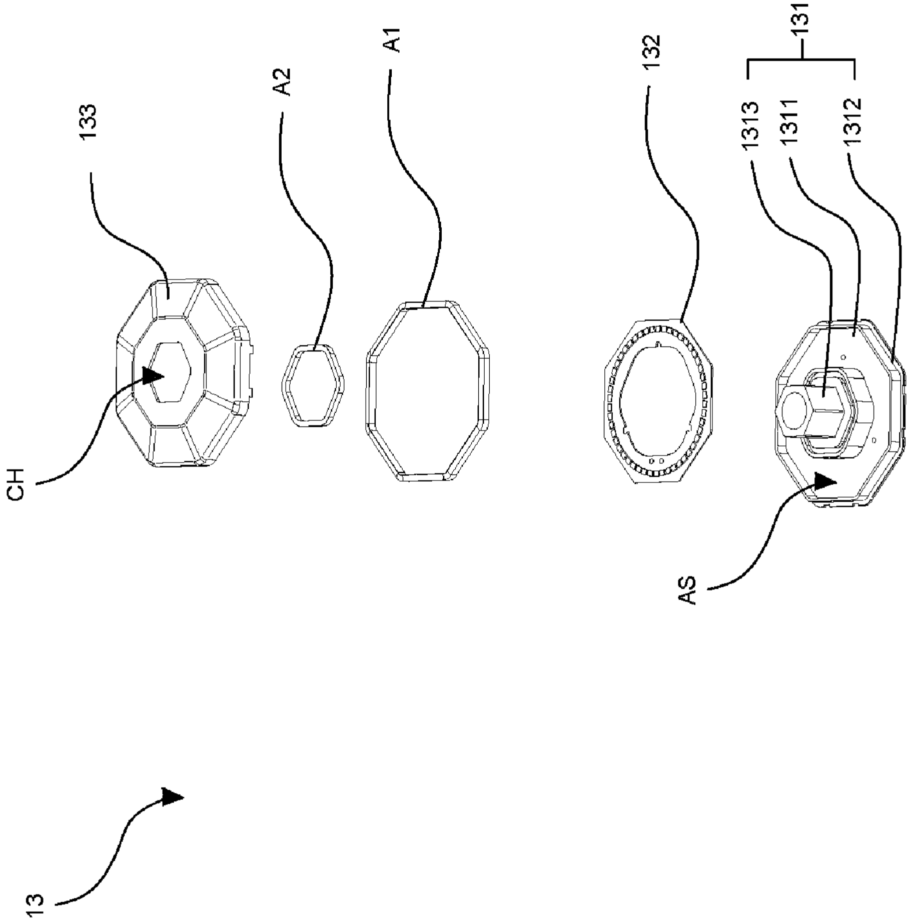
FIG. 4 is an exploded view of a top light-emitting module of the industrial lighting device having integrated-type top light-emitting module in accordance with one embodiment of the present invention.

Please refer to FIG. 4, which is an exploded view of a top light-emitting module of the industrial lighting device having integrated-type top light-emitting module in accordance with one embodiment of the present invention; please also refer to FIG. 2. As shown in FIG. 4, the top light-emitting module 13 includes a heat dissipation base 131, a top light source board 132 and a top cover 133.

The heat dissipation base 131 includes a base body 1311, an outer wall 1312, a central fixation portion 1313 and a base body fixation portion 1314. The central fixation portion 1313 of the heat dissipation base 131 is disposed at the center of one side of the base body 1311 of the heat dissipation base 131. The outer wall 1312 of the heat dissipation base 131 is disposed on the base body 1311 of the heat dissipation base 131 and surrounds the central fixation portion 1313 of the heat dissipation base 131. In this way, an accommodating space AS can be formed between the base body 1311, the outer wall 1312 and the central fixation portion 1313 of the heat dissipation base 131. The top light source board 132 of the top light-emitting module 13 is disposed in the accommodating space AS and the top cover 133 of the top light-emitting module 13 is disposed on the outer wall 1312 of the heat dissipation base 131 in order to cover the accommodating space AS. The central fixation portion 1313 penetrates through the central hole CH of the top cover 133 of the top light-emitting module 13.

As shown in FIG. 2, the other side of the base body 1311 of the heat dissipation base 131 is provided with a plurality of heat dissipation fins D2. The base body fixation portion 1314 of the heat dissipation base 131 is disposed at the center of the other side of the base body 1311 of the heat dissipation base 131, and connected to the upper connecting portion 132 of the driving module adapter base 14. In this embodiment, the base body fixation portion 1314 of the heat dissipation base 131 is provided with internal thread and the upper connecting portion 142 of the driving module adapter base 14 is provided with external thread. Thus, the base body fixation portion 1314 of the heat dissipation base 131 can be connected to the upper connecting portion 142 of the driving module adapter base 14 via the above threads.

Further, the top surface 111 of the driving module 11 is provided with a top surface fixation portion 1111 and the top surface fixation portion 1111 is connected to the lower connecting portion 143 of the driving module adapter base 14. In this embodiment, the top surface fixation portion 1111 of the driving module 11 is provided with internal thread and the lower connecting portion 143 of the driving module adapter base 14 is provided with external thread. Therefore, the top surface fixation portion 1111 of the driving module 11 can be connected to the lower connecting portion 143 of the driving module adapter base 14 via the above threads. The above connection structure can also greatly increase the efficiency of the manufacturing process of the industrial lighting device 1.

As set forth above, the industrial lighting device 1 includes the driving module 11, the main light-emitting module 12 and the top light-emitting module 13. The top light-emitting module 13 is disposed on the top surface 111 of the driving module 11, and includes the heat dissipation base 131, the top light source board 132 and the top cover 133. The heat dissipation base 131 of the top light-emitting module 13 includes the base body 1311, the outer wall 1312 and the central fixation portion 1313. The above structure makes the top light-emitting module 13 have an integrated-type structure instead of being formed by several modules combined with each other. As a result, the above structure can significantly reduce the manpower coast and time cost of the industrial lighting device 1 in order to meet the needs of market.

Moreover, the industrial lighting device 1 includes the driving module adapter base 14, which includes the partitioning portion 141, the upper connecting portion 132 and the lower connecting portion 143. The top light-emitting module 13 is connected to the top surface 111 of the driving module 11 via the driving module adapter base 14. The above structure design can make the top light-emitting module 13 be away from the heat radiator 121 of the main light-emitting module 12 by a certain distance with a view to preventing the top light-emitting module 13 from being influenced by the heat radiation generated by the heat radiator 21. In addition, the partitioning portion 141 can further provide the heat isolating function, which can be made of a heat isolating material, such as plastics, fiber glass or other currently available heat isolating materials in order to further enhance the heat isolating performance thereof. The above structure design can effectively avoid that the top light-emitting module 13 suffers from light decay so as to further extend the service life of the top light-emitting module 13. Further, the top heat dissipation fins D2 of the heat dissipation base 131 can further improve the heat dissipation performance of the top light-emitting module 13.

The central fixation portion 1313 of the heat dissipation base 131 is connected to the fixing element 15. The fixing element 15 can be detachably fixed at the central fixation portion 1313. In this embodiment, the fixing element 15 may be a ring hook. The central fixation portion 1313 of the heat dissipation base 131 is provided with internal thread and the fixing element 15 is provided with external thread, such that the central fixation portion 1313 of the heat dissipation base 131 can be connected to the fixing element 15 via the above threads. Therefore, the central fixation portion 1313 of the heat dissipation base 131 can be detachably connected to the fixing element 15, so the user can replace the fixing element 15 by another one according to actual requirements. Thus, the industrial lighting device 1 can provide different fixation mechanisms without any adapter piece. In this way, the industrial lighting device 1 can satisfy actual requirements.

In this embodiment, the top light-emitting module 13 further includes a top outer water-proof ring A1 and a top inner water-proof ring A2. The top outer water-proof ring A1 surrounds the outer wall 1312 of the heat dissipation base 131 and the top inner water-proof ring A2 surrounds the central fixation portion 1313 of the heat dissipation base 131. The above dual-layer water-proof structure design can effectively enhance the water-proof performance of the top light-emitting module 13, such that the industrial lighting device 1 can be applicable to humid environments and the failure rate thereof can be greatly decreased.

The embodiment just exemplifies the present invention and is not intended to limit the scope of the present invention; any equivalent modification and variation according to the spirit of the present invention is to be also included within the scope of the following claims and their equivalents.

It is worthy to point out that the top light-emitting modules of most of currently available industrial lighting devices (such as mining lamps, etc.) are directly disposed on the backs of the heat radiators thereof, and the above structure will influence the heat dissipation of the lighting device. Besides, the top light-emitting module of the currently available industrial lighting device will also be influenced by the heat radiation of the heat radiator thereof, so that the temperature of the top light-emitting module is always high. For the reason, the top light-emitting module is prone to suffer from light decay. In addition, the top light-emitting module of the currently available industrial lighting device is composed of several modules, and the manufacturing process thereof consumes a lot of manpower and time. In addition, the water-proof function of the currently available industrial lighting device still needs to be further improved. Further, most of the currently available industrial lighting devices only have one type of fixation element. Thus, it needs additional adapter pieces to realize different fixing methods. The aforementioned adapter pieces also require additional costs. Therefore, the currently available industrial lighting devices cannot meet the actual requirements. On the contrary, according to one embodiment of the present invention, the industrial lighting device includes the integrated-type top light-emitting module. The top light-emitting module includes a top outer water-proof ring and a top inner water-proof ring. The top outer water-proof ring surrounds the outer wall of the heat dissipation base of the top light-emitting module and the top inner water-proof ring surrounds the central fixation portion of the heat dissipation base of the top light-emitting module. The above dual-layer water-proof structure design significantly improves the water-proof performance of the top light-emitting module. Accordingly, the industrial lighting device can be applicable to humid environments and the failure rate thereof can also be greatly reduced.

Also, according to one embodiment of the present invention, the industrial lighting device has a driving module adapter base, which includes a partitioning portion, an upper connecting portion and a lower connecting portion. The top light-emitting module is connected to the top surface of the driving module via the driving module adapter base. The above structure design can make the top light-emitting module be away from the main light-emitting module by a certain distance in order to avoid that the top light-emitting module is influenced by the heat radiation generated by the heat radiator. The above structure design can effectively avoid that the top light-emitting module suffers from light decay with a view to extending the service life of the top light-emitting module.

Further, according to one embodiment of the present invention, the top light-emitting module has a heat dissipation base and the other side of the base body of the heat dissipation base is provided with a plurality of upper heat dissipation fins. The above upper heat dissipation fins can further improve the heat dissipation effect of the top light-emitting module, which can effectively avoid that the top light-emitting module suffers from light decay so as to extend the service life of the top light-emitting module.

Moreover, according to one embodiment of the present invention, the central fixation portion of the heat dissipation base is detachably connected to the fixation element, so the user can replace the fixation element according to actual requirements. Accordingly, the industrial lighting device can provide different fixation mechanisms without any adapter piece. Therefore, the industrial lighting device can further conform to actual requirements.

Furthermore, according to one embodiment of the present invention, the industrial lighting device is of simple structure, so can achieve the desired technical effects without significantly increasing the cost thereof. Thus, the industrial lighting device can achieve high commercial value. Accordingly, the industrial lighting device according to the embodiments of the present invention can definitely achieve great technical effects.

Figure 5:
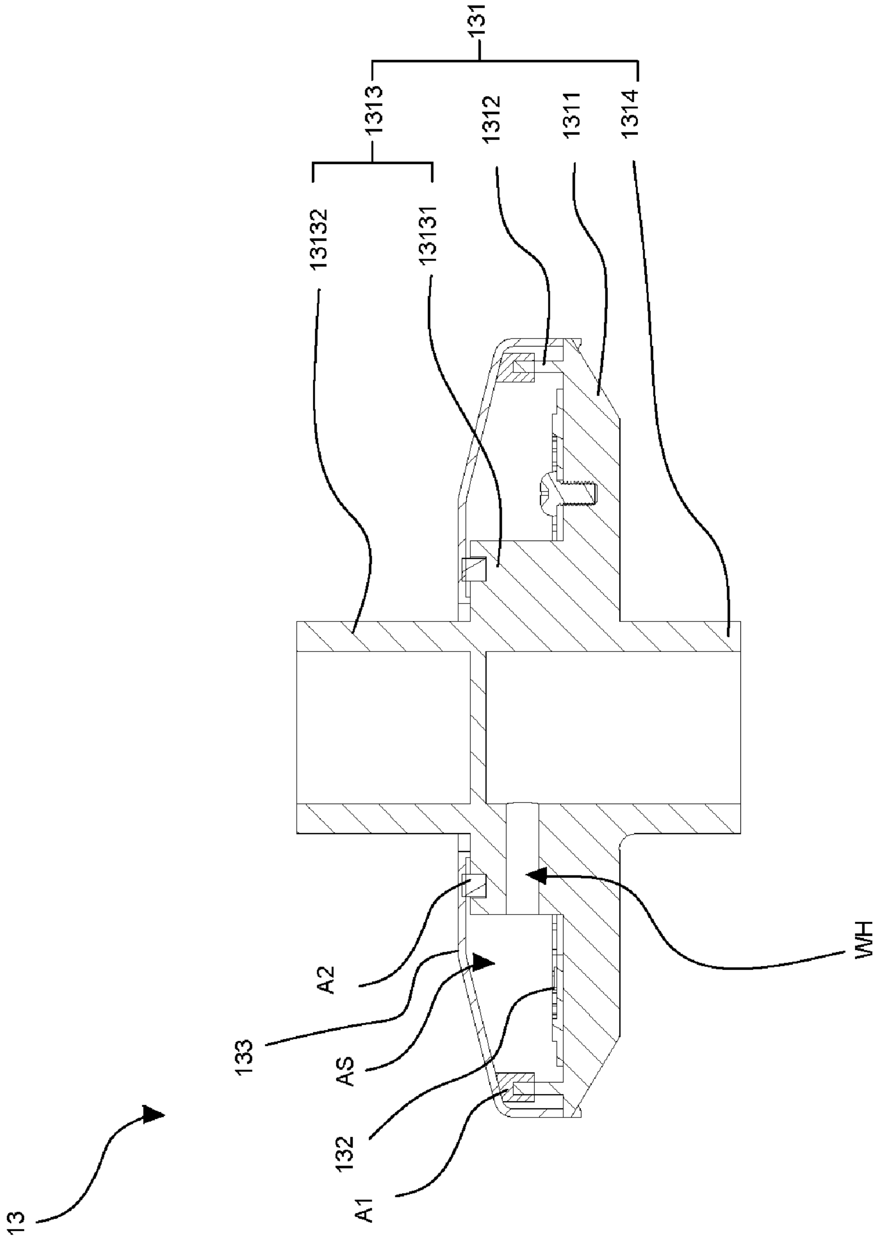
FIG. 5 is a sectional view of the top light-emitting module of the industrial lighting device having integrated-type top light-emitting module in accordance with one embodiment of the present invention.

Please refer to FIG. 5, which is a sectional view of the top light-emitting module of the industrial lighting device having integrated-type top light-emitting module in accordance with one embodiment of the present invention. As shown in FIG. 5, the top light-emitting module 13 includes the heat dissipation base 131, the top light source board 132, the top cover 133, the top outer water-proof ring A1 and the top inner water-proof ring A2. The heat dissipation base 131 includes the base body 1311, the outer wall 1312, the central fixation portion 1313 and the base body fixation portion 1314. The central fixation portion 1313 of the heat dissipation base 131 is disposed on the base body 1311 of the heat dissipation base 131 and surrounds the central fixation portion 1313 of the heat dissipation base 131. Thus, the accommodating space AS can be formed between the base body 1311, the outer wall 1312 and the central fixation portion 1313 of the heat dissipation base 131. The top light source board 132 of the top light-emitting module 13 is disposed in the accommodating space AS and the top cover 133 of the top light-emitting module 13 is disposed on the outer wall 1312 of the heat dissipation base 131 so as to cover the accommodating space AS. In this embodiment, the two sides of the top cover 133 of the top light-emitting module 13 are provided with two hooks, such that the top cover 133 of the top light-emitting module 13 can be fixed on the base body 1111 of the heat dissipation base 131 via these hooks without any screws. This structure can further decrease the manufacturing cost of the industrial lighting device 1.

The central fixation portion 1313 of the heat dissipation base 131 includes a central base 13131 and a central post 13132 connected to each other. The central base 13131 and a central post 13132 are cylindrical. In addition, the diameter of the central base 13131 is greater than that of the central post 13132. The top inner water-proof ring A2 surrounds the central fixation portion 1313 of the heat dissipation base 131 and disposed on the central base 13131. The top outer water-proof ring A1 is disposed at the top of the outer wall 1312 of the heat dissipation base 131 to surround the outer wall 1312 of the heat dissipation base 131, which can form a special dual-layer water-proof structure. Thus, the water-proof performance of the top light-emitting module 13 can be greatly enhanced. Accordingly, the market competitiveness of the industrial lighting device 1 can be effectively increased, so the industrial lighting device 1 can have high commercial value.

Moreover, the central fixation portion 1313 can be further provided with a wire hole WH and the top light source board 132 of the top light-emitting module 13 can be electrically connected to the driving module 11 via a cable (not shown in the drawings).

The embodiment just exemplifies the present invention and is not intended to limit the scope of the present invention; any equivalent modification and variation according to the spirit of the present invention is to be also included within the scope of the following claims and their equivalents.

Figure 6:
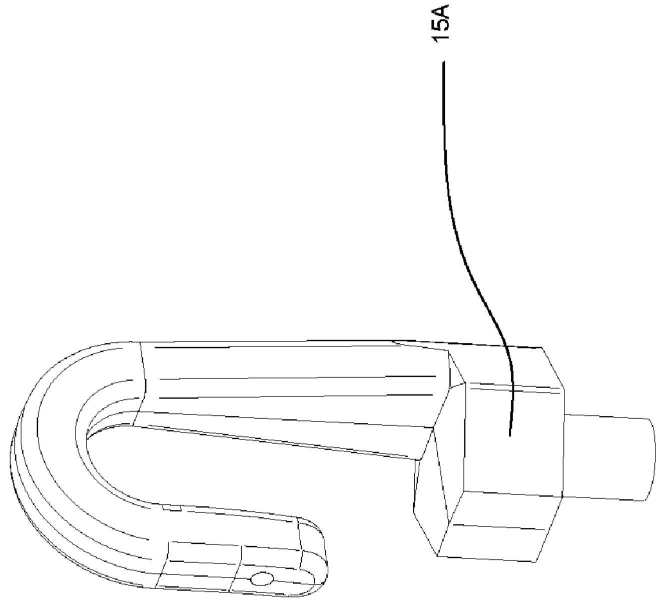
FIG. 6 is a first schematic view of a fixing element of the top light-emitting module of the industrial lighting device having integrated-type top light-emitting module in accordance with one embodiment of the present invention.
Figure 7:
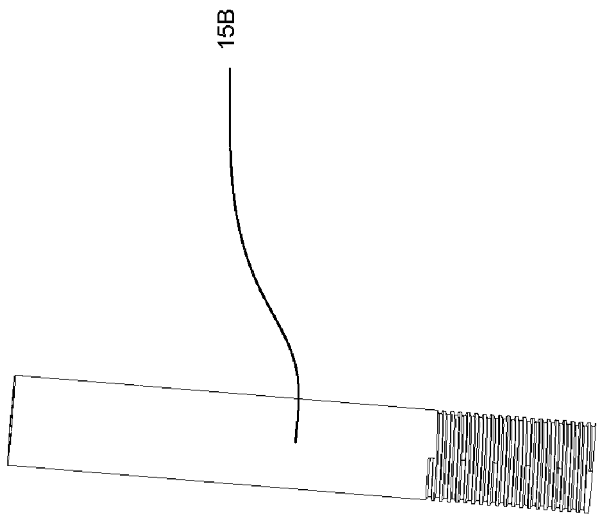
FIG. 7 is a second schematic view of a fixing element of the top light-emitting module of the industrial lighting device having integrated-type top light-emitting module in accordance with one embodiment of the present invention.

Please refer to FIG. 6 and FIG. 7; please also refer to FIG. 1. FIG. 6 is a first schematic view of a fixing element of the top light-emitting module of the industrial lighting device having integrated-type top light-emitting module in accordance with one embodiment of the present invention. FIG. 7 is a second schematic view of a fixing element of the top light-emitting module of the industrial lighting having device integrated-type top light-emitting module in accordance with one embodiment of the present invention. As shown in FIG. 6, the fixing element 15 (ring hook) shown in FIG. 1 can be replaced by the fixing element 15A (hanging hook) shown in FIG. 6 so as to satisfy the requirements of the user.

As shown in FIG. 7, the fixing element 15 (ring hook) shown in FIG. 1 can be replaced by the fixing element 15A (hanging post) shown in FIG. 7 so as to satisfy the requirements of the user.

The central fixation portion 1313 of the heat dissipation base 131 can be detachably connected to the fixing element, so the user can replace the fixing element according to actual requirements. Thus, the industrial lighting device 1 can provide different fixation mechanisms without any adapter piece. Therefore, the industrial lighting device 1 can be more comprehensively in application and flexible in use. In this way, the industrial lighting device 1 can conform to actual requirements.

The embodiment just exemplifies the present invention and is not intended to limit the scope of the present invention; any equivalent modification and variation according to the spirit of the present invention is to be also included within the scope of the following claims and their equivalents.

Figure 8:
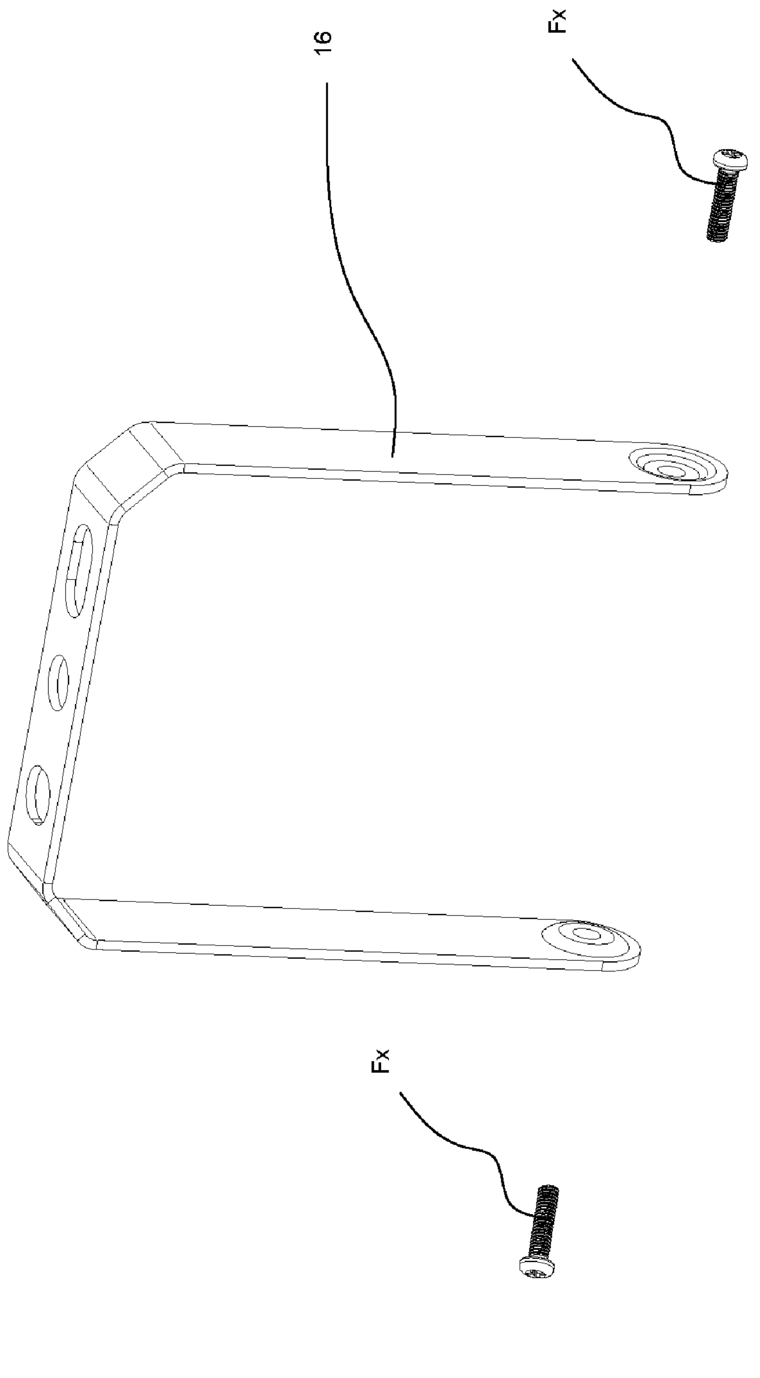
FIG. 8 is a schematic view of an assistant fixing element of the top light-emitting module of the industrial lighting device having integrated-type top light-emitting module in accordance with one embodiment of the present invention.

Please refer to FIG. 8, which is a schematic view of an assistant fixing element of the top light-emitting module of the industrial lighting device having integrated-type top light-emitting module in accordance with one embodiment of the present invention; please also refer to FIG. 1. As shown in FIG. 8, the industrial lighting device 1 can further include an assistant fixing element 16 and the top surface 111 of the driving module 11 are further provided with two fixing plates SP. The above assistant fixing element 16 can be fixed at the two fixing plates SP via two locking elements Fx.

As previously stated, the industrial lighting device 1 can provide different fixation mechanisms without any adapter piece. Therefore, the industrial lighting device 1 can be more comprehensively in application and flexible in use. In this way, the industrial lighting device 1 can conform to actual requirements.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the industrial lighting device includes a driving module, a main light-emitting module and a top light-emitting module. The top light-emitting module is disposed on the top surface of the driving module, and includes a heat dissipation base, a top light source board and a top cover. The heat dissipation base of the top light-emitting module includes a base body, an outer wall and a central fixation portion. The above structure makes the top light-emitting module have an integrated-type structure, which can significantly reduce the manpower cost and time cost of the manufacturing process of the industrial lighting device. Therefore, the industrial lighting device can meet the needs of market.

According to one embodiment of the present invention, the industrial lighting device includes the integrated-type top light-emitting module. The top light-emitting module includes a top outer water-proof ring and a top inner water-proof ring. The top outer water-proof ring surrounds the outer wall of the heat dissipation base of the top light-emitting module and the top inner water-proof ring surrounds the central fixation portion of the heat dissipation base of the top light-emitting module. The above dual-layer water-proof structure design significantly improves the water-proof performance of the top light-emitting module. Accordingly, the industrial lighting device can be applicable to humid environments and the failure rate thereof can also be greatly reduced.

Also, according to one embodiment of the present invention, the industrial lighting device has a driving module adapter base, which includes a partitioning portion, an upper connecting portion and a lower connecting portion. The top light-emitting module is connected to the top surface of the driving module via the driving module adapter base. The above structure design can make the top light-emitting module be away from the main light-emitting module by a certain distance in order to avoid that the top light-emitting module is influenced by the heat radiation generated by the heat radiator. The above structure design can effectively avoid that the top light-emitting module suffers from light decay with a view to extending the service life of the top light-emitting module.

Further, according to one embodiment of the present invention, the top light-emitting module has a heat dissipation base and the other side of the base body of the heat dissipation base is provided with a plurality of upper heat dissipation fins. The above upper heat dissipation fins can further improve the heat dissipation effect of the top light-emitting module, which can effectively avoid that the top light-emitting module suffers from light decay so as to extend the service life of the top light-emitting module.

Moreover, according to one embodiment of the present invention, the central fixation portion of the heat dissipation base is detachably connected to the fixation element, so the user can replace the fixation element according to actual requirements. Accordingly, the industrial lighting device can provide different fixation mechanisms without any adapter piece. Therefore, the industrial lighting device can further conform to actual requirements.

Furthermore, according to one embodiment of the present invention, the industrial lighting device is of simple structure, so can achieve the desired technical effects without significantly increasing the cost thereof. Thus, the industrial lighting device can achieve high commercial value.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An industrial lighting device having integrated-type top light-emitting module, comprising:

a driving module having a top surface and a protrusion portion;

a main light-emitting module fixed at the protrusion portion of the driving module;

a top light-emitting module disposed on the top surface of the driving module, and comprising a heat dissipation base, a top light source board and a top cover; and a driving module adapter base comprising an upper connecting portion, a lower connecting portion and a partitioning portion disposed between the upper connecting portion and the lower connecting portion, wherein the top light-emitting module is connected to the top surface of the driving module via the driving module adapter base;

wherein the heat dissipation base of the top light-emitting module is provided with a base body, an outer wall and a central fixation portion, and the central fixation portion of the heat dissipation base is disposed at a center of one side of the base body of the heat dissipation base, and the outer wall of the heat dissipation base is disposed on the base body of the heat dissipation base and surrounds the central fixation portion of the heat dissipation base, whereby an accommodating space is formed between the base body, the outer wall and the central fixation portion of the heat dissipation base, wherein the top light source board of the top light-emitting module is disposed in the accommodating space, and the top cover of the top light-emitting module is disposed on the outer wall of the heat dissipation base in order to cover the accommodating space, and the central fixation portion of the heat dissipation base penetrates through a central hole of the top cover of the top light-emitting module.

2. The industrial lighting device having integrated-type top light-emitting module as claimed in claim 1, wherein the top light-emitting module further comprises a top outer water-proof ring surrounding the outer wall of the heat dissipation base and a top inner water-proof ring surrounding the central fixation portion of the heat dissipation base.

3. The industrial lighting device having integrated-type top light-emitting module as claimed in claim 1, wherein the central fixation portion of the heat dissipation base is connected to a fixation element detachably fixed at the central fixation portion of the heat dissipation base.

4. The industrial lighting device having integrated-type top light-emitting module as claimed in claim 1, wherein the heat dissipation base further comprises a base body fixation portion disposed at a center of another side of the base body of the heat dissipation base and connected to the upper connecting portion of the driving module adapter base.

5. The industrial lighting device having integrated-type top light-emitting module as claimed in claim 4, wherein the top surface of the driving module is provided with a top surface fixation portion connected to the lower connecting portion of the driving module adapter base.

6. The industrial lighting device having integrated-type top light-emitting module as claimed in claim 1, wherein another side of the base body of the heat dissipation base is provided with a plurality of upper heat dissipation fins.

7. The industrial lighting device having integrated-type top light-emitting module as claimed in claim 1, wherein the main light-emitting module comprises a heat radiator, a main light source board and a lens, wherein the main light source board and the lens are disposed on one side of the heat radiator, whereby the main light source board is disposed between the lens and the heat radiator.

8. The industrial lighting device having integrated-type top light-emitting module as claimed in claim 7, wherein another side of the heat radiator is provided with a plurality of main heat dissipation fins.

* * * * *